United States Patent

[11] 3,581,853

[72] Inventor Stephen J. Hoff
 Richmond, Ind.
[21] Appl. No. 817,661
[22] Filed Apr. 21, 1969
[45] Patented June 1, 1971
[73] Assignee Hoffco, Inc.
 Richmond, Ind.

[54] TWO-SPEED MOTOR-BIKE DRIVE
 6 Claims, 5 Drawing Figs.
[52] U.S. Cl. ................................................ 192/4,
 192/3.5, 192/12, 192/26, 192/48.92, 74/217
[51] Int. Cl. ........................................... F16h 57/10,
 F16d 67/02
[50] Field of Search ........................................ 74/217;
 192/48.92, 26, 48.6, 49.92

[56] References Cited
 UNITED STATES PATENTS
2,230,293 2/1941 Harris .......................... 74/217
2,463,100 3/1949 Gredell ........................ 74/217
2,488,892 11/1949 Arzt .............................. 74/217B
2,538,667 1/1951 Chamberlin ................... 74/217
2,638,791 5/1953 Rogers ........................... 192/486X
2,809,535 10/1957 Hein et al. ..................... 74/217X
2,885,896 5/1959 Hungerford et al. .......... 192/48.92X Primary Examiner—Benjamin W. Wyche
Attorney—Trask, Jenkins & Hanley ABSTRACT: A two-speed chain transmission for minibikes, as original equipment or as a conversion kit. High- and low-speed sprockets on a jackshaft are chain driven at different speeds by high and low drive sprockets carried by a centrifugal clutch on the engine shaft. The jackshaft is chain connected to the rear wheel of the bike. The low speed driven sprocket is mounted on the jackshaft by an overrunning clutch which permits the jackshaft to overrun the low drive when it is driven by the high drive. The high-speed sprocket is mounted on the jackshaft by a clutch which is disengageable to let the low-speed drive takeover. A brake acts on the jackshaft on the driven side of the clutches.

INVENTOR
STEPHEN J. HOFF
BY
Frank Jenkins + Hanley
ATTORNEYS

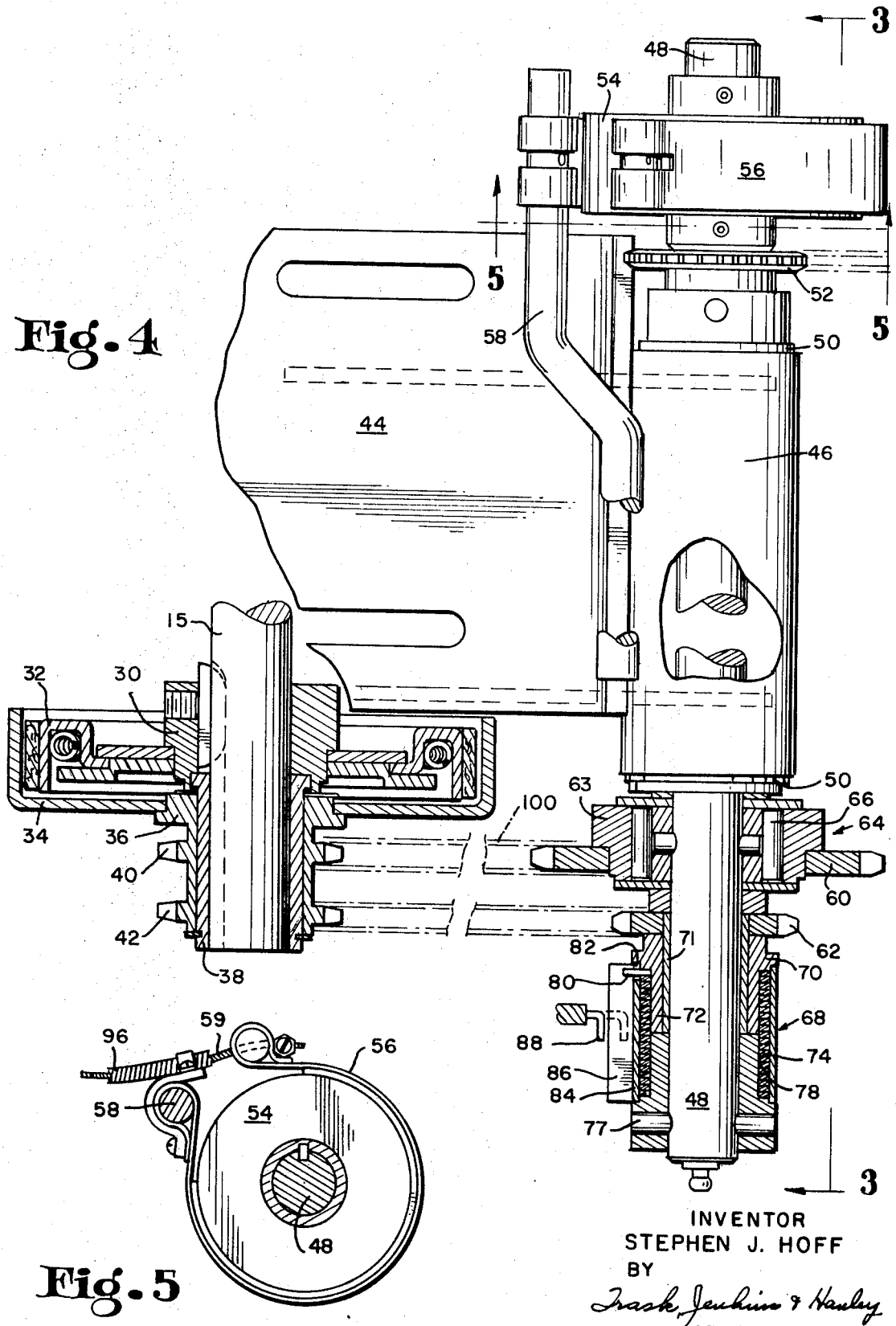

TWO-SPEED MOTOR-BIKE DRIVE

This invention relates to a two-speed transmission for motorbikes of the type commonly referred to as "minibikes." The transmission may be used as original equipment or may be supplied as a conversion kit.

Minibikes in their simplest form comprise an internal combustion engine which through a centrifugal clutch and chain drives the rear wheel. Some units include a jackshaft in the drive train. The present invention utilizes a jackshaft connected by a drive chain to the rear drive wheel. The engine shaft carries a centrifugal clutch which drives high-speed and low-speed drive sprockets connected by chains at different speed ratios to high-speed and low-speed driven sprockets on the jackshaft. One of the low-speed sprockets is connected to its shaft through an overrunning clutch which allows the jackshaft to overrun the low-speed drive train when the high-speed drive train is operative; and one of the high-speed sprockets is connected to its shaft by a releasable clutch which permits the low-speed drive train to take over the drive when the high-speed drive train is declutched.

The overrunning and releasable clutches have the effect of isolating the rear drive wheel from the motor shaft and of preventing the motor from exerting a braking effect, and a brake is desirably provided on the jackshaft at a position beyond the point at which such isolation occurs.

The invention contemplates providing the transmission in a conversion kit for application to single-speed bikes. Such a kit may include a mounting bracket which fits between the engine and its frame support. Such bracket carries bearings for the jackshaft, an anchor for the fixed parts of the brake, and a support for the operating control of the releasable clutch. The kit also includes a centrifugal clutch and drive-sprocket assembly to be mounted on the engine shaft, the jackshaft and its sprockets, and the overrunning and releasable clutches. Chains may be included, or left for the purchaser to obtain from stock sources.

The accompanying drawings illustrate the invention and show a preferred embodiment. In such drawings:

FIG. 4 is a plan view of the assembly shown in FIG. 2, with the shaft spacing shortened for convenient illustration; and FIG. 5 is an end view of the brake, taken on the line 5–5 of FIG. 4.

Figure 1:
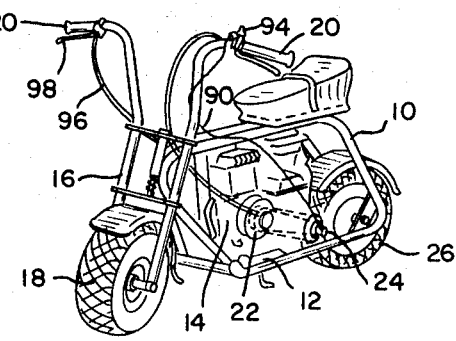
FIG. 1 is a pictorial view of a minibike equipped with a two-speed transmission in accordance with the invention.

The motorbike shown in FIG. 1 comprises a frame 10 having a platform 12 supporting an engine 14. The frame is pivoted to a steering fork 16 mounted on the front wheel 18 and controlled by handlebars 20. The motor 14 drives a centrifugal clutch 22 which is connected by high and low drive chains to a jackshaft 24 which in turn is connected by a drive chain not shown to the rear wheel 26 of the bike.

Figure 2:
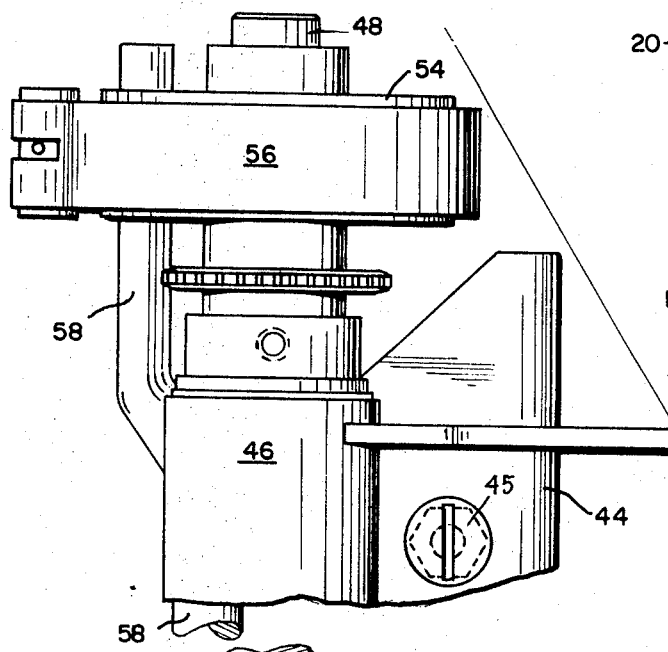
FIG. 2 is an isometric view of a conversion kit embodying the invention, with the parts shown in operative relationship.
Figure 2:
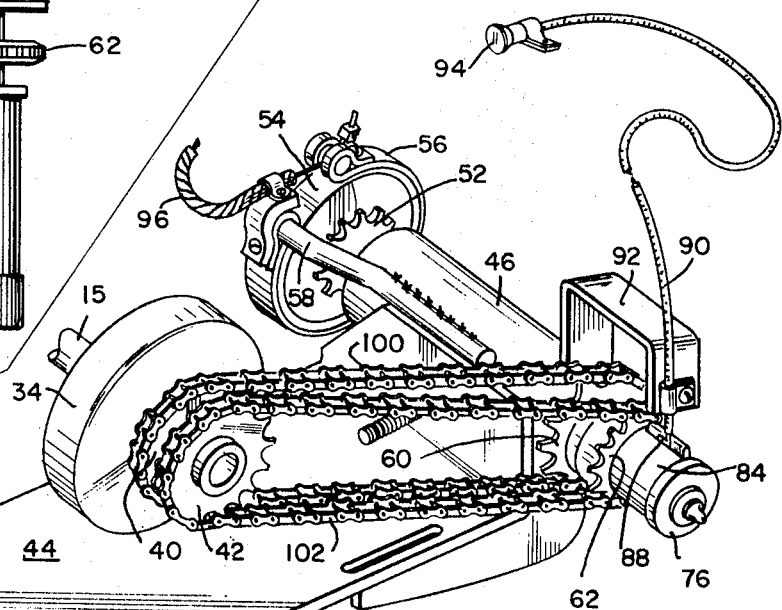
Figure 3:
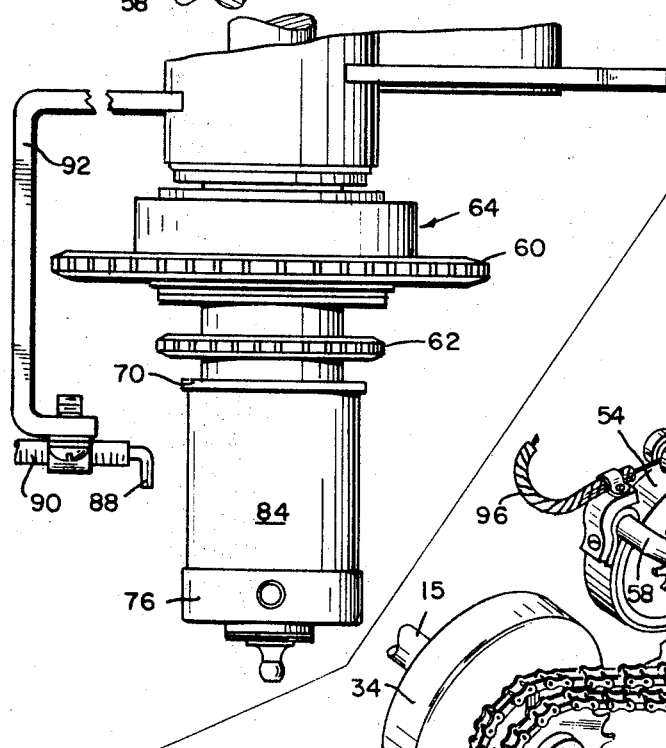
FIG. 3 is a rear elevation of the assembly shown in FIG. 2.

As shown in FIGS. 2 and 4, the motor shaft 15 carries the hub 30 of a centrifugal clutch having drive shoes 32 which are normally disengaged but which under centrifugal force move outward into engagement with a driven clutch drum 34. Such drum 34 is carried by a sprocket hub 36 rotatable on a bearing sleeve 38 carried by the motor shaft 15 and fixed to the hub 30. The sprocket hub 36 carries a fixed low-speed sprocket 40 and a fixed high-speed sprocket 42, which may be of the same size as shown.

The conversion kit shown in FIGS. 2 and 4 comprises a mounting bracket having a plate 44 adapted to be mounted on the engine platform 12 of the bike and to support the engine 14. At the rear, such plate is bent upward and its top edge carries a tubular-mounting sleeve 46 in which the jackshaft 48 is mounted by means of suitable bearings 50. A screw 45 is threaded through the upward bent portion to position the engine on the platform.

The jackshaft, at its remote end as shown in FIG. 2, carries a final drive sprocket 52 adapted to be connected by a chain to a sprocket on the rear wheel 26. Outward from such sprocket the jackshaft also carries a brake drum 54 adapted to be engaged by a band brake 56 carried by an offset mounting bar 58 welded to the mounting sleeve 46.

A low-speed driven sprocket 60 and a high-speed sprocket 62 are mounted on the jackshaft 48 by means of clutches, in alignment with the high- and low-speed sprockets 40 and 42 carried by the motor shaft 15. The low-speed sprocket 60 is fixed on the outer element 63 of an overrunning clutch 64 of a known type in which rollers 66 clutch such outer element to a hub 67 in forward drive direction but permit overrunning in the opposite direction. The clutch is arranged to permit the jackshaft 48 to overrun the low-speed driven sprocket 60 when the jackshaft is driven at a higher speed by the high-speed sprocket 62.

The high-speed sprocket 62 is mounted on and driven from the jackshaft 48 by means of a coil spring clutch 68. This comprises a hub 70 which carries the sprocket and has an inner bearing sleeve 71 rotatably mounted on the jackshaft 48. The hub 70 is the clutch driving element and has an outer cylindrical clutch face 72 for engagement with a clutch spring 74. A driven clutch element 76 is mounted in coaxial abutting relation with the driving hub 70 and is provided with an outer cylindrical surface 78 in alignment with the surface 72 of the hub 70. The driven element 76 is pinned to the jackshaft by a cross pin 77. The connecting clutch spring 74 is a close-wound helical spring, wound of such hand that relative rotation of the driving hub 70 in a driving direction with respect to the driven element 76 causes the spring to wind up and tighten itself onto the cylindrical surfaces 72 and 78, and thus to clutch the driving and driven elements together. The leading end of the spring lies adjacent the sprocket-end of the hub 70 and is bent outward to a form a control finger 80. Such finger 80 is engaged in a notch 82 in a control sleeve 84 rotatably mounted on the driving and driven elements 70 and 76 and closely surrounding the spring 74. The control sleeve 84 has a laterally projecting axial rib 86 by which the control sleeve 84 can be stopped from rotation by projection of a control foot 88 into the path of rotation of the rib 86.

The control foot 88 may be the bentover end of a Bowden wire mounted in a sheath 90 supported by a bracket 92 carried by the jackshaft-mounting sleeve 46. As shown in FIG. 1, the Bowden wire clutch control extends upward to a control knob 94 mounted on the left handlebar 20 of the minibike. A brake-actuating lever 98 on the right handlebar 20 is connected by a similar Bowden wire 96 to actuate the brake band 56 to apply braking effort to the drum 54.

When the parts described above are mounted for use, the low-speed sprockets 40 and 60 are connected by a low-speed chain 100, and the high-speed sprockets 42 and 62 are connected by a high-speed chain 102.

Operation of the two-speed transmission is as follows. Assume that the speed control knob 94 is pushed in, so that the control foot 88 lies in the path of rotation of the rib 86 on the control sleeve 84 for the high-speed clutch 68. This anchors the leading end of the clutch spring 74 against forward rotation, and the relationship is then such that forward-drive rotation of the driving hub 70 and of the driven element 76 tends to unwind the helical spring 74 with respect to its anchored leading end 80, and therefore permits either or both of the driving or driven elements to overrun the spring 74 in a forward-drive direction. The high-speed clutch 68 will then be effectively disengaged.

With the engine idling and the shaft 15 rotating at idling speed, the shoes 32 of the centrifugal clutch will be retracted, and no drive will be transmitted from the engine to the clutch drum 34. When the engine is accelerated, the clutch shoes 32 are thrown outward by centrifugal force to engage the drum 34 and drive it and the two sprockets 40 and 42. With the high-speed clutch 68 in disengaged condition as described above, drive will be through the low-speed sprocket 40 and the low-speed chain 100 to the low-speed driven sprocket 60. Such low-speed driven sprocket 60 will then rotate the outer clutch element 63 in a forward-drive direction relative to the jackshaft, and the roller clutch 64 will engage and transmit driving torque to the jackshaft 48. The jackshaft 48 will rotate the drive sprocket 52 to transmit drive to the rear wheel 26 of the minibike at the low-speed ratio determined by the relative sizes of the low-speed sprockets 40 and 60.

For high-speed drive, after the low-speed drive has accelerated the bike to a satisfactory speed, the operator decelerates the engine and pulls out the knob 94 to retract the control foot 88 from the path of rotation of the rib 86 on the high-speed clutch control sleeve 84. This releases the leading end of the clutch spring 74 for its normal clutching action. Forward rotation of the high-speed driving element 70 by the sprocket 62 will then cause the spring 74 to wind up on the clutch surfaces 72 and 78 to clutch the driving and driven elements together. The jackshaft 48 will then be driven by the high-speed sprocket 62 at a speed determined by the size ratio of the high-speed sprockets 42 and 62, and faster than the low-speed sprocket 60. The low-speed roller clutch 64 will then overrun to allow the jackshaft 48 to rotate at the higher sped, and the high-speed drive will be transmitted to the drive sprocket 52 and the rear wheel 26.

Since both clutches 64 and 68 have overrunning properties, they will not be capable of transmitting drive from the rear wheel to the engine shaft 14, and the connection will not permit the engine to act as a brake for the bike. The drive train will however, provide a positive drive connection between the rear wheel and the brake drum 54, and ample braking action will be obtained by tightening the brake band 56 about such drum 54 by means of the brake control handle 98 and its control cable 96.

The two-speed transmission may be embodied as original equipment on the bike by equipping the bike frame 10 with a jackshaft-mounting tube 46 and mounting the jackshaft 48 in such tube in the manner shown and described.

The two-speed transmission can also be provided as a conversion of a bike not so equipped. If the bike has a jackshaft, the original jackshaft may be replaced by the jackshaft 48 of the present invention. Where the bike does not have a jackshaft and jackshaft mounting, the kit shown in FIG. 2 may be used. The engine is loosened from its mounting and the platform 44 of the mounting bracket is inserted between the engine and its original platform mounting. This will provide the jackshaft-mounting tube 46, and connections can be made as shown in FIG. 2 and described above.

The arrangement of FIG. 2 places the drive sprocket 52 on the opposite side of the bike from the projecting end of the motor drive shaft 15, and some modification may be necessary if the rear wheel has its sprocket on the same side of the bike as the projecting end of the motor shaft 15. Either of two modifications may be used. One modification is to reverse the position of the rear wheel 26 to place its sprocket on the opposite side. The other modification is to transfer the drive sprocket 52 from the remote end of the jackshaft 48 as shown in FIG. 2 to the near end of such jackshaft, between the low-speed sprocket 60 and the adjacent bearing 50.

I claim:

1. A two-speed drive for a motorbike having an engine shaft, a jackshaft and a drive wheel, adapted to be positively controlled by the operator of the motorbike, comprising high-speed and low-speed drive sprockets mounted for rotation by said engine shaft, high-speed and low-speed driven sprockets or transmitting drive to the drive wheel, mounted on said jackshaft and connected respectively to said drive sprockets to provide high-speed and low-speed drive trains, said low-speed driven sprocket being connected to the jackshaft by an overrunning clutch arranged to overrun when the high-speed drive train is engaged, said high-speed driven sprocket being connected to the jackshaft by a disengageable high-speed clutch, and operating means arranged for positive control by the operator to disengage said high-speed clutch and thereby cause the low-speed drive train to become operative, said disengageable clutch comprising a driving clutch member rotatably mounted on the jackshaft with the high-speed driven sprocket, a driven clutch member fixed to the jackshaft, said driving and driven clutch members having aligned cylindrical clutch surfaces, and a coil spring engaged with said clutch surfaces and wound in a direction to clutch the same together for forward drive transmission, and said operating means comprising blocking means to block rotation of the leading end of said clutch spring to disengage the same from both clutch surfaces.

2. A two-speed drive according to claim 1 with the addition of a centrifugal clutch having a shoe assembly mounted on the engine shaft and a clutch drum rotatably mounted coaxially with and engageable by the shoe assembly, the drive sprockets being mounted for rotation with the clutch drum.

3. A two-speed drive according to claim 1 with the addition of means to connect the jackshaft in positive drive relation to the drive wheel, a brake rotor on the jackshaft and means for braking said rotor to apply braking effort in the drive train between said clutches and the drive wheel.

4. A kit for providing an operator-controlled two-speed drive for a motorbike having a frame, an engine support, an engine having a shaft, and a drive wheel, comprising an engine platform adapted to be mounted on the engine support of the motorbike and to receive the engine thereon, a high-speed drive sprocket and a low-speed drive sprocket adapted to be mounted on and driven by the engine shaft, jackshaft bearings fixed to the platform in position to mount a jackshaft on an axis between the engine and the drive wheel, a jackshaft mounted in said bearings, a low-speed driven sprocket mounted on said jackshaft and operatively connected thereto by an overrunning clutch adapted to permit the jackshaft to overrun said driven sprocket in the forward drive direction of rotation thereof, a high-speed driven sprocket mounted on said jackshaft and operatively connected thereto by a disengageable clutch, and operating means adapted for positive control by the operator for actuating said disengageable clutch between engaged and disengaged conditions.

5. A two-speed drive kit according to claim 4, further comprising a mounting bracket including said engine platform adapted to be mounted on the engine support of the motorbike and to receive the engine thereon, and a bearing tube transversely fixed to the bracket in position to lie between an engine received on the platform and the drive wheel of the bike, said jackshaft bearings being mounted in said bearing tube.

6. A two-speed drive kit according to claim 4, further comprising a brake support bar fixed to said bracket and projecting beyond said bearing tube in offset relation to its axis, a brake rotor on the jackshaft, and a brake mean carried by said bar for applying braking effort to the brake rotor.